(12) United States Patent
Abad et al.

(10) Patent No.: US 8,968,871 B2
(45) Date of Patent: *Mar. 3, 2015

(54) COMPOSITE REINFORCEMENT

(75) Inventors: Vincent Abad, Clermont-Ferrand Cedex 9 (FR); Sebastien Rigo, Clermont-Ferrand Cedex 9 (FR); Emmanuel Custodero, Clermont-Ferrand Cedex 9 (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,443

(22) PCT Filed: Jun. 23, 2011

(86) PCT No.: PCT/EP2011/060543
§ 371 (c)(1),
(2), (4) Date: Mar. 25, 2013

(87) PCT Pub. No.: WO2012/016757
PCT Pub. Date: Feb. 9, 2012

(65) Prior Publication Data
US 2013/0177764 A1 Jul. 11, 2013

(30) Foreign Application Priority Data
Aug. 5, 2010 (FR) .................................. 10 56465

(51) Int. Cl.
D07B 1/06 (2006.01)
B29B 15/12 (2006.01)
(Continued)

(52) U.S. Cl.
CPC ............ *D07B 1/0633* (2013.01); *B29B 15/122* (2013.01); *B60C 9/0007* (2013.01); *D07B 1/0666* (2013.01); *C08K 3/10* (2013.01);
(Continued)

(58) Field of Classification Search
USPC ................................... 428/378; 152/450, 451
See application file for complete search history.

(56) References Cited

U.S. PATENT DOCUMENTS

| 4,754,794 A | 7/1988 | Bocquet et al. |
| 4,857,128 A * | 8/1989 | Bocquet et al. .......... 156/244.12 |

(Continued)

FOREIGN PATENT DOCUMENTS

| DE | 22 63 951 | 7/1974 |
| WO | WO 2010/136389 | 12/2010 |

*Primary Examiner* — Ling Choi
*Assistant Examiner* — Lanee Reuther
(74) *Attorney, Agent, or Firm* — Cozen O'Connor

(57) ABSTRACT

Composite reinforcer (R-2) self-adhesive, by curing, to a diene rubber matrix, which can be used as reinforcing element for a tire, comprising: one or more reinforcing thread(s) (20), for example a carbon steel cord; a first layer (21) of a thermoplastic polymer, the glass transition temperature of which is positive, for example, a polyamide 6, 6, covering individually said thread or each thread or collectively several threads; a second layer (22) comprising a functionalized diene elastomer bearing functional groups selected from epoxide, carboxyl, acid anhydride and acid ester groups, for example, an epoxidized natural rubber, covering the first layer (21). Process for manufacturing such a composite reinforcer and rubber article or semi-finished product, especially a tire, incorporating such a composite reinforcer.

22 Claims, 3 Drawing Sheets

(51) Int. Cl.
*B60C 9/00* (2006.01)
*C08K 3/10* (2006.01)
*B29B 15/14* (2006.01)
B29K 21/00 (2006.01)
B29K 63/00 (2006.01)
B29K 77/00 (2006.01)

(52) U.S. Cl.
CPC ............ *B29B15/14* (2013.01); *B29K 2021/00* (2013.01); *B29K 2063/00* (2013.01); *B29K 2077/00* (2013.01); *D07B 2201/2012* (2013.01); *D07B 2201/2013* (2013.01); *D07B 2201/2044* (2013.01); *D07B 2201/2045* (2013.01); *D07B 2205/2039* (2013.01); *D07B 2205/2046* (2013.01); *D07B 2205/2078* (2013.01); *D07B 2205/2082* (2013.01); *D07B 2501/2046* (2013.01)
USPC ........................................................ 428/378

(56) References Cited

U.S. PATENT DOCUMENTS

2007/0031661 A1* 2/2007 Kanenari ................ 428/355 BL
2010/0175805 A1 7/2010 Wada

* cited by examiner

COMPOSITE REINFORCEMENT

RELATED APPLICATIONS

This is a U.S. National Phase Application under 35 USC 371 of International Application PCT/EP2011/060543 filed on Jun. 23, 2011.

This application claims the priority of French application no. 10/56465 filed Aug. 5, 2010, the entire content of which is hereby incorporated by reference.

FIELD OF THE INVENTION

The field of the present invention is that of reinforcing elements or reinforcers, notably metallic ones, which can be used to reinforce diene rubber articles or semi-finished products such as, for example, pneumatic tires.

The present invention relates more particularly to reinforcers of the hybrid or composite type that consist of at least one core, in particular a metal core, said core being sheathed or covered by one or more layers of a polymer.

BACKGROUND OF THE INVENTION

The sheathing of metallic reinforcers with thermoplastic polymers, such as for example a polyamide or polyester, has been known for a very long time, especially so as to protect these reinforcers from various types of external attack such as oxidation or abrasion, or else for the purpose of structurally stiffening, by bonding them together, various groups of threads or thread assemblies such as cords, and thus increasing particularly their buckling resistance.

Such composite reinforcers, together with their use in rubber articles such as pneumatic tires, have been described in many patent documents.

Patent application EP 0 962 576 has for example described a reinforcer, made of steel or an aramid textile, sheathed by a thermoplastic material such as a polyester or polyamide, for the purpose of improving its abrasion resistance.

Patent application FR 2 601 293 has described the sheathing of a metal cord with a polyamide so as to use it as a bead wire in a pneumatic tire bead, this sheathing advantageously enabling the shape of this bead wire to adapt to the structure and to the operating conditions of the bead of the tire that it reinforces.

Patent documents FR 2 576 247 and U.S. Pat. No. 4,754,794 have also described metal cords or threads that can be used as a bead wire in a pneumatic tire bead, these cords or threads being doubly-sheathed or even triply-sheathed by two or even three different thermoplastic materials (e.g. polyamides) having different melting points, with the purpose, on the one hand, of controlling the distance between these threads or cords and, on the other hand, of eliminating the risk of wear by rubbing or of corrosion, in order to use them as a bead wire in a pneumatic tire bead.

These reinforcers thus sheathed with a polyester or polyamide material have, apart from the aforementioned advantages of corrosion resistance, abrasion resistance and structural rigidity, the not insignificant advantage of them being able to be subsequently bonded to diene rubber matrices using simple textile adhesives called RFL (resorcinol-formaldehyde-latex) adhesives comprising at least one diene elastomer, such as natural rubber, which adhesives are known to provide satisfactory adhesion between textile fibres, such as polyester or polyamide fibres, and a diene rubber.

Thus, it may be advantageous to use metal reinforcers not coated with adhesive metal layers, such as with brass, and also surrounding rubber matrices containing no metal salts, such as cobalt salts, which are necessary as is known for maintaining the adhesive properties over the course of time but which significantly increase, on the one hand, the cost of the rubber matrices themselves and, on the other hand, their oxidation and ageing sensitivity (see for example the patent application WO 2005/113666).

However, the above RFL adhesives are not without drawbacks: in particular they contain as base substance formaldehyde, a substance which it is desirable long-term to eliminate from adhesive compositions because of the recent changes in European regulations regarding this type of product.

BRIEF DESCRIPTION OF THE DRAWINGS

One object of the invention is to provide new adhesive systems or new reinforcers that enable all or some of the aforementioned drawbacks to be alleviated.

This and other objects are attained in accordance with one aspect of the invention directed to a composite reinforcer comprising: one or more reinforcing thread(s);

a first layer of a thermoplastic polymer, the glass transition temperature of which is positive, covering individually said thread or each thread or collectively several threads; and a second layer comprising a functionalized diene elastomer bearing functional groups selected from epoxide, carboxyl, acid anhydride and acid ester groups, covering the first layer.

Unexpectedly, it has been found that the presence of this functionalized diene elastomer makes it possible to ensure that the composite reinforcer of the invention adheres directly and strongly to a diene elastomer matrix or composition such as those widely used in tires.

In addition, and just as unexpectedly, the adhesive properties are very significantly improved with respect to the use of a conventional textile RFL adhesive.

Another aspect of the invention is directed to a process for manufacturing the above composite reinforcer, said process comprising at least the following steps:

the reinforcing thread or each reinforcing thread is covered individually, or several reinforcing threads are covered collectively by a first layer of the thermoplastic polymer having a positive glass transition temperature;

a second layer comprising the functionalized diene elastomer bearing functional groups selected from epoxide, carboxyl, acid anhydride and acid ester groups, is deposited on the first layer; and the assembly undergoes a thermo-oxidative treatment.

A composite reinforcer according to embodiments of the invention can be used as reinforcing element for rubber articles or semi-finished products, particularly tires, especially those intended to be fitted onto motor vehicles of the passenger type, SUVs ("Sport Utility Vehicles"), two-wheel vehicles (especially bicycles and motorcycles), aircraft, or industrial vehicles selected from vans, "heavy" vehicles, i.e. underground trains, buses, heavy road transport vehicles (lorries, tractors, trailers), off-road vehicles, such as agricultural or civil engineering machines, and other transport or handling vehicles.

Another aspect of the invention relates to any rubber article or semi-finished product, in particular a tire, that includes a composite reinforcer according to embodiments of the invention.

BRIEF DESCRIPTION OF THE DRAWINGS

Figure 1:
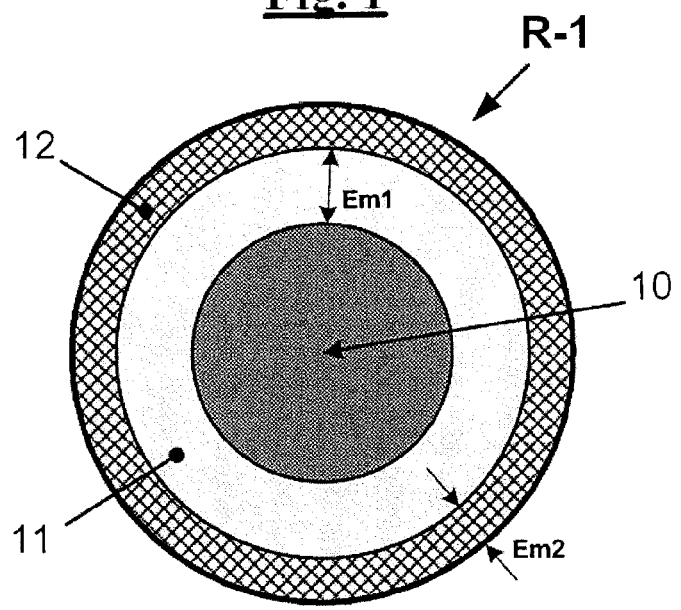
Figure 2:
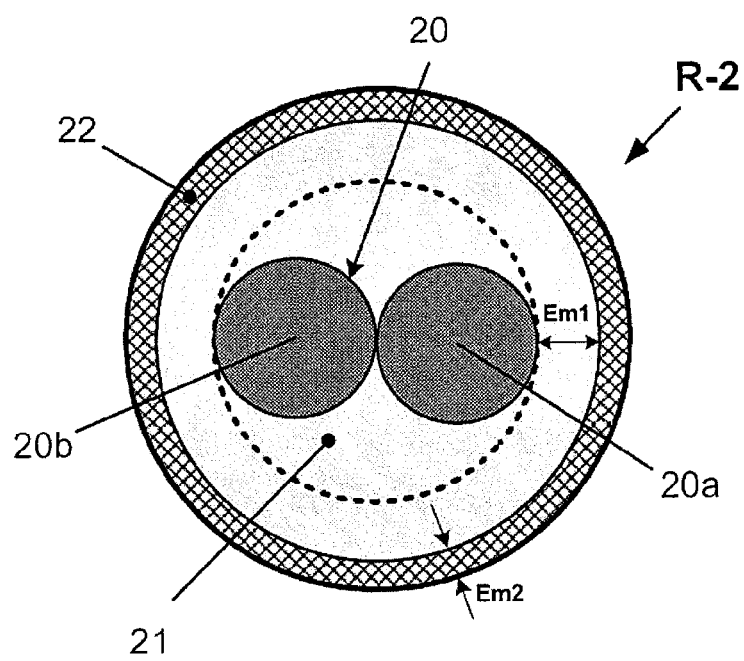
Figure 3:
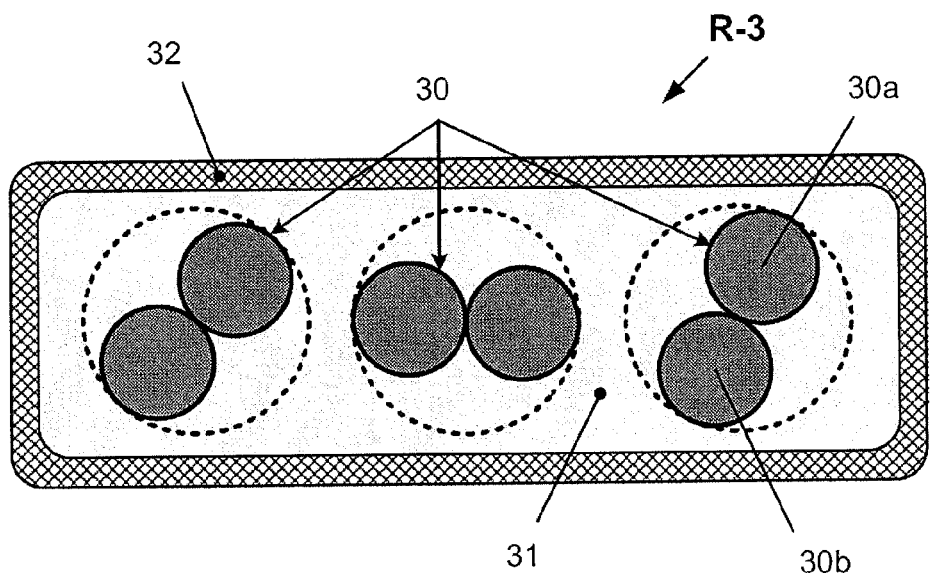
Figure 4:
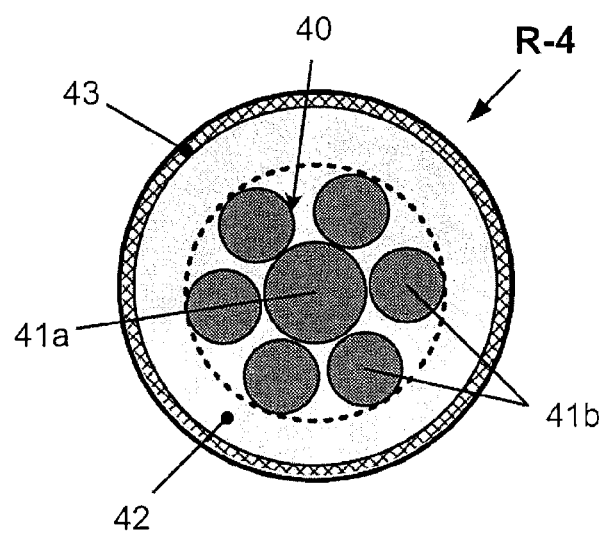
Figure 5:
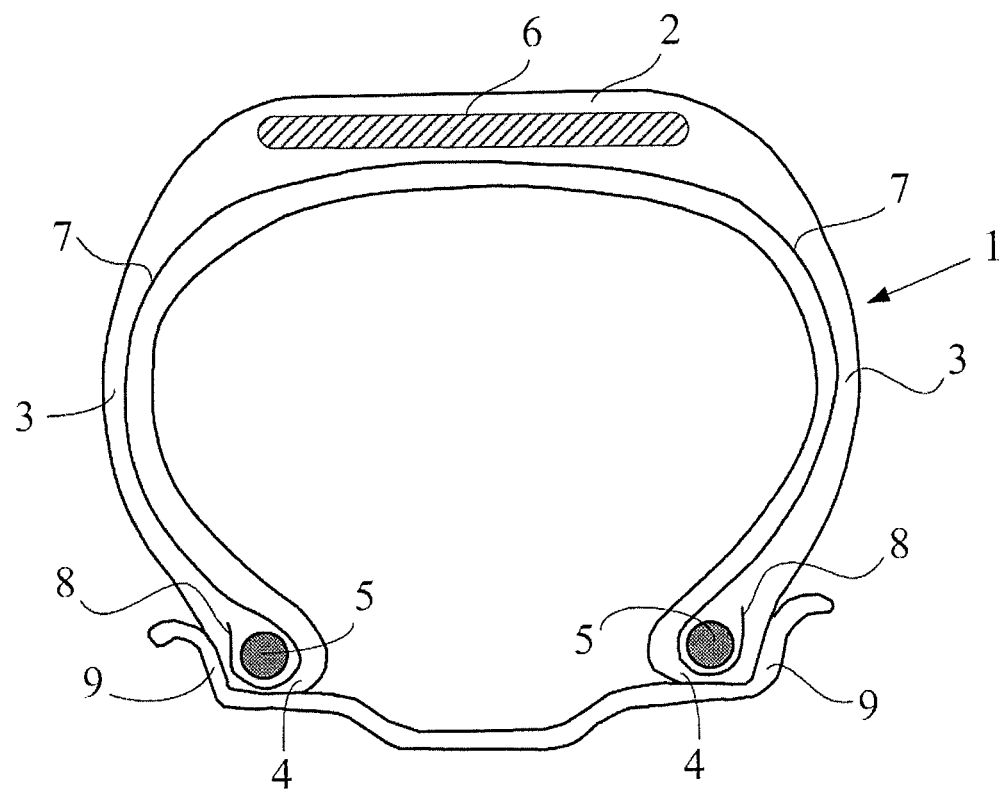

FIG. 1 shows, in cross section, an example of a composite reinforcer according to the invention;

FIG. 2 shows, in cross section, another example of a reinforcer according to the invention;

FIG. 3 shows, in cross section, another example of a reinforcer according to the invention;

FIG. 4 shows, in cross section, another example of a reinforcer according to the invention; and FIG. 5 shows, in radial section, a tire having a radial carcass reinforcement, in accordance with the invention, incorporating a composite reinforcer according to the invention.

DETAILED DESCRIPTION OF THE DRAWINGS

In the present description, unless expressly indicated otherwise, all the percentages (%) indicated are % by weight.

Moreover, any range of values denoted by the expression "between a and b" represents the range of values starting from more than a to less than b (i.e. with the limits a and b excluded), whereas any range of values denoted by the expression "from a to b" means the range of values starting from a and going up to b (i.e. including the strict limits a and b).

The composite reinforcer of the invention, capable of adhering directly to an unsaturated rubber composition and able to be used in particular for reinforcing diene rubber articles, such as tires, therefore has the essential features of comprising:
  at least one reinforcing thread (i.e. one or more reinforcing threads);
  a first layer of a thermoplastic polymer, the glass transition temperature of which is positive (i.e. above 0° C.), covering individually said thread or each thread or collectively several threads; and
  a second layer comprising a functionalized diene elastomer bearing functional groups selected from epoxide, carboxyl, acid anhydride and acid ester groups, covering said first layer.

In other words, the composite reinforcer of the invention comprises a single reinforcing thread or several reinforcing threads, each reinforcing thread being covered (individually or collectively) by two different superposed layers of polymer in contact with one another. The structure of the reinforcer of the invention is described in detail below.

In the present application, the term "reinforcing thread" is understood in general to mean any elongate element of great length relative to its cross section, whatever the shape, for example circular, oblong, rectangular, square, or even flat, of this cross section, it being possible for this thread to be straight or not straight, for example twisted or wavy.

This reinforcing thread may take any known form. For example, it may be an individual monofilament of large diameter (for example and preferably equal to or greater than 50 µm), an individual ribbon, a multifilament fibre (consisting of a plurality of individual filaments of small diameter, typically less than 30 µm), a textile folded yarn formed from several fibres twisted together, a textile or metal cord formed from several fibres or monofilaments cabled or twisted together, or else an assembly, a row of threads such as, for example, a band or strip comprising several of these monofilaments, fibres, folded yarns or cords grouped together, for example aligned along a main direction, whether straight or not.

The or each reinforcing thread has a diameter preferably smaller than 5 mm, especially in the range from 0.1 to 2 mm.

Preferably, the reinforcing thread is a metal reinforcing thread, especially a carbon steel wire such as those used in steel cords for tires. However, it is of course possible to use other types of steel, for example stainless steel. When a carbon steel is used, its carbon content is preferably between 0.4% and 1.2%, especially between 0.5% and 1.1%. The invention applies in particular to any steel of the steel cord type having a standard or NT ("Normal Tensile") strength, a high or HT ("High Tensile") strength, a very high or SHT ("Super High Tensile") strength or an ultra-high or UHT ("Ultra High Tensile") strength.

More preferably, the metal reinforcing thread is in the form of a cord comprising at least two (i.e. two or more) metal monofilaments assembled together, more particularly made of carbon steel.

The steel could be coated with an adhesive layer, such as a layer of brass or zinc. However, a bright, i.e. uncoated, steel may advantageously be used. Furthermore, by virtue of the invention, the rubber composition intended to be reinforced by a metal reinforcer according to the invention no longer requires the use in its formulation of metal salts such as cobalt salts.

The first layer or sheath covering the or each reinforcing yarn is formed by a thermoplastic polymer having by definition a positive glass transition temperature (Tg), preferably above +20° C. and more preferably above +30° C. Moreover, the melting point (Tm) of this thermoplastic polymer is preferably above 100° C., more preferably above 150° C. and especially above 200° C. depending especially on the nature (in particular textile or metal nature) of the material forming the reinforcing thread.

This thermoplastic polymer is preferably selected from the group consisting of polyamides, polyesters and polyimides, more particularly from the group consisting of aliphatic polyamides and polyesters. Among polyesters, mention may for example be made of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Among aliphatic polyamides, mention may in particular be made of the polyamides 4,6, 6, 6,6, 11 and 12. This thermoplastic polymer is preferably an aliphatic polyamide, more preferably a polyamide 6,6 (or nylon-6,6).

The second layer covering the first layer, and therefore in direct contact with the latter, is formed by a functionalized diene elastomer, said elastomer bearing functional groups selected from epoxide, carboxyl, acid anhydride or acid ester groups or functions.

Preferably, the functional groups are epoxide groups, i.e. the diene elastomer is an epoxidized diene elastomer.

It is recalled that the term "elastomer" or "rubber" (the two terms being, in a known manner, synonymous and interchangeable) of the "diene" type should be understood to mean an elastomer resulting at least in part (i.e., a homopolymer or a copolymer) from diene monomers (monomers bearing two carbon-carbon double bonds which may or may not be conjugated).

These diene elastomers, which by definition are not thermoplastic elastomers in the present application, having a Tg that, in the very great majority of cases, is negative (i.e. below 0° C.), may be classified, in a known manner, into two categories: those said to be "essentially unsaturated" and those said to be "essentially saturated". Butyl rubbers, such as for example diene/α-olefin copolymers of the EPDM type, fall under the category of essentially saturated diene elastomers, having a low or very low content of units of diene origin, always less than 15% (mol %). A contrario, the expression "essentially unsaturated diene elastomer" is understood to mean a diene elastomer resulting at least in part from conjugated diene monomers, having a content of units of diene origin (conjugated dienes) that is greater than 15% (mol %). In the "essentially unsaturated" diene elastomer category, the expression "highly unsaturated diene elastomer" is understood in particular to mean a diene elastomer having a content of units of diene origin (conjugated dienes) that is greater than 50%.

It is preferred to use at least one diene elastomer of the highly unsaturated type, in particular a diene elastomer selected from the group consisting of natural rubber (NR), synthetic poly-isoprenes (IRs), polybutadienes (BRs), butadiene copolymers, isoprene copolymers and mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), and mixtures of such copolymers.

The above diene elastomers can, for example, be block, random, sequential or microsequential diene elastomers and can be prepared in dispersion or in solution; they can be coupled and/or star-branched or else functionalized with a coupling and/or star-branching or functionalizing agent.

The following are preferably suitable: polybutadienes and in particular those having a content of 1,2-units of between 4% and 80% or those having a content of cis-1,4-units of greater than 80%, polyisoprenes, butadiene/styrene copolymers and in particular those having a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and especially those having an isoprene content of between 5% and 90% by weight and a glass transition temperature from −40° C. to −80° C., or isoprene/styrene copolymers and especially those having, a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a Tg of between −20° C. and −70° C., are especially suitable.

The glass transition temperature of the thermoplastic polymers and of the diene elastomers described above is measured, in a known manner, by DSC (Differential Scanning Calorimetry), for example and except for different indications specified in the present application, according to the ASTM D3418 (1999) Standard.

A second essential feature of the diene elastomer used in the composite reinforcer of the invention is that it is functionalized, bearing functional groups selected from epoxide, carboxyl, acid anhydride or acid ester groups or functions.

Such functionalized diene elastomers and the processes for obtaining them are well known to a person skilled in the art and are commerically available. Diene elastomers bearing carboxyl groups have been described, for example, in WO 01/92402 or U.S. Pat. No. 6,815,473 and WO 2004/096865 or U.S. Pat. No. 7,312,264; diene elastomers bearing epoxide groups have been described, for example, in US 2003/120007 or EP 0763564 and U.S. Pat. No. 6,903,165 or EP 1403287.

Preferably, the functional groups are epoxide groups, i.e. the diene elastomer is an epoxidized diene elastomer. More preferably still, the epoxidized diene elastomer is selected from the group consisting of epoxidized natural rubbers (NRs), epoxidized synthetic poly-isoprenes (IRs), epoxidized polybutadienes (BRs) preferably having a content of cis-1,2-bonds of greater than 90%, epoxidized butadiene/styrene copolymers (SBRs), and mixtures of these elastomers.

Natural rubbers (abbreviated to "ENRs"), for example, may be obtained, as is known, by epoxidation of natural rubber, for example via processes based on chlorohydrin or bromohydrin or processes based on hydrogen peroxides, alkyl hydroperoxides or peracids (such as peracetic acid or performic acid); such ENRs are for example sold under the names "ENR-25" and "ENR-50" (respective degrees of epoxidation of 25% and 50%) by the company Guthrie Polymer. Epoxidized BRs are themselves also well known, sold for example by the company Sartomer under the name "Poly Bd" (for example "Poly Bd 605E"). Epoxidized SBRs may be prepared by epoxidation techniques well known to a person skilled in the art.

The degree (mol %) of functionalization, especially epoxidation, of the functionalized diene elastomers described above may vary to a large extent depending on the particular embodiments of the invention, preferably within a range from 5% to 60%. When the degree of epoxidation is less than 5%, the intended technical effect risks being insufficient whereas above 60%, the molecular weight of the polymer greatly decreases. For all these reasons, the degree of functionalization, especially epoxidation, is more preferably within a range from 10% to 50%.

The epoxidized diene elastomers described above are, in a known manner, solid at ambient temperature (20° C.); the term "solid" is understood to mean any substance that does not have the ability to eventually assume, at the latest after 24 hours, under the sole effect of gravity and at ambient temperature (20° C.), the shape of the container in which it is held.

In contrast in particular to elastomers of the liquid type, these solid elastomers are characterized by a very high viscosity: their Mooney viscosity in the uncured (i.e. uncrosslinked) state, denoted by ML (1+4), measured at 100° C., is preferably greater than 20, more preferably greater than 30, in particular between 30 and 130. An oscillating consistometer as described in the standard ASTM D1646 (1999) is used for this measurement. The measurement is carried out according to the following principle: the sample analysed in the uncured state (i.e. before curing) is moulded (formed) in a cylindrical chamber heated to a given temperature (for example 100° C.). After preheating for 1 minute, the rotor turns within the test specimen at 2 rpm and the working torque for maintaining this movement is measured after rotating for 4 minutes. The Mooney viscosity (ML 1+4) is expressed in "Mooney units" (MU, where 1 MU=0.83 Newton.meter).

FIG. 1 appended hereto shows very schematically (without being drawn to a specific scale), in cross section, a first example of a composite reinforcer according to the invention. This composite reinforcer denoted by R-1 consists of a reinforcing thread (10) consisting of a unitary filament or monofilament having a relatively large diameter (for example between 0.10 and 0.50 mm), for example made of carbon steel, which is covered with a first layer (11) of a thermoplastic polymer having a positive glass transition temperature, for example made of a polyamide or a polyester, the minimum thickness of which is denoted by $E_{m1}$ in FIG. 1. A second layer (12) of a functionalized diene elastomer, for example of a BR, SBR or NR of the epoxidized type, covers the first layer (11) and a has a minimum thickness denoted by $E_{m2}$ in FIG. 1.

FIG. 2 shows schematically, in cross section, a second example of a composite reinforcer according to the invention. This composite reinforcer denoted R-2 consists of a reinforcing thread (20) consisting in fact of two unitary filaments or monofilaments (20a, 20b) of relatively large diameter (for example between 0.10 and 0.50 mm) twisted or cabled together, for example made of carbon steel. The reinforcing thread (20) is covered in a first layer (21) of a thermoplastic polymer having a positive glass transition temperature, for example made of polyamide 6,6 or a polyester, with a minimum thickness $E_{m1}$. A second layer (22) of a functionalized diene elastomer, for example of an epoxidized BR, SBR or NR, with a minimum thickness of $E_{m2}$ covers the first layer (21).

FIG. 3 shows schematically, in cross section, another example of a composite reinforcer according to the invention. This composite reinforcer denoted by R-3 consists of three reinforcing threads (30) each consisting of two monofilaments (30a, 30b) of relatively large diameter (for example between 0.10 and 0.50 mm) twisted or cabled together, for example made or steel or carbon. The assembly formed by for example the three aligned reinforcing threads (30) is covered with a first layer (31) of a thermoplastic polymer having a positive glass transition temperature, for example a polyamide or a polyester. A second layer (32) of a functionalized diene elastomer, for example of an epoxidized BR, SBR or NR, covers the first layer (31).

FIG. 4 shows schematically, again in cross section, another example of a composite reinforcer according to the invention. This composite reinforcer R-4 comprises a reinforcing thread (40) consisting of a steel cord of (1+6) construction, with a central wire or core wire (41a) and six filaments (41b) of the same diameter that are wound together in a helix around the central wire. This reinforcing thread or cord (40) is covered with a first layer (42) of a polyamide 6,6 which is itself covered with a second layer (43) of a functionalized diene elastomer, for example an epoxidized BR, SBR or NR.

In the composite reinforcers according to the invention, such as those shown schematically for example in the aforementioned FIGS. 1 to 4, the minimum thickness of the two layers ($E_{m1}$ and $E_{m2}$) may vary very widely depending on the particular production conditions of the invention.

The minimum thickness $E_{m1}$ of the first layer is preferably between 1 µm and 2 mm, more preferably between 10 µm and 1 mm.

According to a particular embodiment of the invention, the minimum thickness $E_{m2}$ of the second layer may be of the same order of magnitude as that of the first layer (in the case of a thick second layer with a thickness for example between 1 µm and 2 mm, in particular between 10 µm and 1 mm), or else may be appreciably different.

According to another particular embodiment of the invention, the second layer could for example be formed by a thin or ultra-thin adhesive layer deposited, for example, indeed not by extrusion but by a coating or spraying technique, or another thin or ultra-thin deposition technique, for example with a thickness in a range from 0.02 µm to 10 µm, in particular between 0.05 µm and 0.5 µm.

If several reinforcing threads are used, the first and second layers may be deposited individually on each of the reinforcing threads (as a reminder, these reinforcing threads may or may not be unitary), as illustrated for example in FIGS. 1, 2 and 4 commented upon above. However, the first and second layers may also be deposited collectively on several reinforcing threads appropriately arranged, for example aligned along a main direction, as illustrated for example in FIG. 3.

The composite reinforcer of the invention can be produced by a specific process comprising at least the following steps:
  during a first step, initially at least one (i.e. one or more) reinforcing thread is firstly covered by the first layer of thermoplastic polymer having a positive glass transition temperature;
  next, during a second step, a second layer comprising the functionalized diene elastomer is deposited on the first layer; and
  finally, the assembly is subjected to a thermo-oxidative treatment.

The first two steps may be carried out, in a manner known to those skilled in the art, continuously in line, or otherwise; for example, these steps consist in making the reinforcing thread pass through dies of suitable diameter in extrusion heads heated to appropriate temperatures.

According to a preferred embodiment, the reinforcing thread or each reinforcing thread (taken individually or collectively) is preheated, for example by induction heating or by IR radiation, before passing into the first extrusion head delivering the thermoplastic polymer. On exiting the extrusion head, the reinforcing thread or each reinforcing thread thus sheathed is then cooled sufficiently for the polymer layer to solidify, for example using cold air or another gas, or by the thread(s) passing through a water bath followed by a drying step. The reinforcing thread or each reinforcing thread thus sheathed and cooled is then covered with the functionalized diene elastomer by passing through a coating bath of suitable dimensions.

The next step consists of a thermo-oxidative treatment intended for improving the bonding between the two layers. The term "thermo-oxidative treatment" is understood by definition to mean a heat treatment in the presence of oxygen, for example the oxygen in the air. Such a step makes it possible to obtain optimum adhesion of the diene second layer to the thermoplastic polymer first layer—a vacuum heat treatment for example has proved to be ineffective.

As an example, a reinforcing thread with a diameter of about 0.6 mm, for example a metal cord consisting simply of two individual monofilaments of 0.3 mm diameter twisted together (as for example illustrated in FIG. 2) is covered with a polyamide 6,6 first layer having a maximum thickness equal to about 0.4 mm, in order to obtain a sheathed reinforcing thread having a total diameter of about 1 mm, on an extrusion/sheathing line comprising two dies, a first die (counter-die or upstream die) having a diameter equal to about 0.7 mm and a second die (or downstream die) having a diameter equal to about 1 mm, both dies being placed in an extrusion head heated to about 300° C. The polyamide, which melts at a temperature of 290° C. in the extruder, thus covers the reinforcing thread on passing through the sheathing head, at a thread run speed typically several tens of m/min for an extrusion pump rate typically of several tens of $cm^3$/min. On exiting this first sheathing die, the thread may be immersed in a cooling tank filled with cold water, in order for the polyamide to solidify and set in its amorphous state, and then dry, for example by heating the take-up reel in an oven.

For the first sheathing step described above, the cord (reinforcing thread) is advantageously preheated, for example by passing through an HF generator or through a heating tunnel, before passing into the extrusion head.

The thread thus covered with polyamide is then covered with the functionalized diene elastomer according to one embodiment adapted to the intended thickness for the second layer.

By way of example, if the intended thickness of the second layer is very substantially smaller than that of the first layer, for example equal to a few tens of nanometers, the thread covered with polyamide passes, for example at a speed of a few m/min or tens of m/min, and over a length of several cm or tens of cm, between two wool baize elements pressed by a mass of 1 kg and continuously imbibed with the functionalized diene elastomer diluted in an appropriate solvent (for example, epoxidized BR, SBR or NR, diluted, with a concentration of 5%, in toluene), so as in this way to cover all of it with an ultra-thin layer of the functionalized diene elastomer.

After the second operation, for example on leaving the coating bath described above, the composite thread passes through a tunnel oven, for example several meters in length, in order to undergo therein a heat treatment in air. This treatment temperature is for example between 150° C. and 300° C., for treatment times of a few seconds to a few minutes depending on the case, it being understood that the duration of the treatment will be shorter the higher the temperature and that the heat treatment necessarily must not lead to the polymer materials used remelting or even excessively softening.

The composite reinforcer of the invention thus completed is advantageously cooled, for example in air, so as to avoid any undesirable sticking problems while it is being wound onto the final take-up reel.

A person skilled in the art will know how to adjust the temperature and the duration of the treatment according to the particular operating conditions of the invention, especially according to the exact nature of the composite reinforcer manufactured, particularly according to whether the treatment is on monofilaments taken individually, cords consisting of several monofilaments or groups of such monofilaments or cords, such as strips.

In particular, a person skilled in the art will have the advantage of varying the treatment temperature and treatment time so as to find, by successive approximations, the operating conditions giving the best adhesion results for each particular embodiment of the invention.

The steps of the process according to the invention that have been described above may advantageously be supplemented with a final treatment for three-dimensionally crosslinking the reinforcer, more precisely its second layer of functionalized diene elastomer, in order to further increase the intrinsic cohesion thereof. This crosslinking may be carried out by any known means, for example by physical crosslinking means such as ion or electron bombardment, or by chemical crosslinking means.

Crosslinking may also take place, while the tires (or more generally rubber articles) that the composite reinforcer of the invention is intended to reinforce, by means of the intrinsic crosslinking system present in the diene rubber compositions used for making such tires (or articles) and coming into contact with the composite reinforcer of the invention.

The composite reinforcer of the invention can be used directly, that is to say without requiring any additional adhesive system, as reinforcing element for a diene rubber matrix, for example in a tire. Advantageously, it may be used to reinforce tires for all types of vehicle, in particular for passenger vehicles or industrial vehicles such as heavy vehicles.

As an example, FIG. 5 appended hereto shows very schematically (without being drawn to a specific scale) a radial section through a tire according to the invention for a passenger vehicle.

This tire 1 comprises a crown 2 reinforced by a crown reinforcement or belt 6, two sidewalls 3 and two beads 4, each of these beads being reinforced with a bead wire 5. The crown 2 is surmounted by a tread (not shown in this schematic figure). A carcass reinforcement 7 is wound around the two bead wires 5 in each bead 4, the upturn 8 of this reinforcement 7 lying for example towards the outside of the tire 1, which here is shown fitted onto its rim 9. The carcass reinforcement 7 consists, as is known per se of at least one ply reinforced by cords, called "radial" cords, for example textile or metal cords, that is to say that these cords are arranged practically parallel to one another and extend from one bead to the other so as to make an angle of between 80° and 90° with the median circumferential plane (the plane perpendicular to the rotation axis of the tire, which is located at mid-distance from the two beads 4 and passes through the middle of the crown reinforcement 6).

This tire 1 of the invention has for example the essential feature that at least one of the crown or carcass reinforcements thereof comprises a composite reinforcer according to the invention. According to another possible embodiment of the invention, it is the bead wires 5 that could be made from a composite reinforcer according to the invention.

EMBODIMENT OF THE INVENTION

Trial 1—Composite Reinforcer Manufacture

Composite reinforcers, according to or not according to the invention, were firstly manufactured in the following manner. The starting reinforcing thread was a steel cord for tires, made of standard steel (having a carbon content of 0.7% by weight), in 1×2 construction consisting of two individual threads or monofilaments 0.30 mm in diameter twisted together with a helix pitch of 10 mm. Cord diameter was 0.6 mm.

This cord was covered with polyamide 6,6 (ZYTEL E40 NC010 from the company DuPont de Nemours; melting point $T_m$ (equal to about 260° C.) was performed on an extrusion-sheathing line by passing it through an extrusion head heated to a temperature of 300° C. and comprising two dies—an upstream die 0.63 mm in diameter and a downstream die 0.92 mm in diameter. The polyamide heated to a temperature of about 290° C. in the extruder (pump rate of 20 cm$^3$/min) thus covered the thread (preheated to about 280-290° C. by passing it through an HF generator) running at a speed of 30 m/min. On leaving the sheathing head, the composite reinforcer obtained was continuously run through a cooling tank filled with water at 5° C., in order for the polyamide to solidify in its amorphous state, before being dried using an air nozzle.

The glass transition temperature of the polymer used above was equal to about +50° C. (for example according to the following procedure: 822-2 DSC instrument from Mettler Toledo; a helium atmosphere; specimen preheated from room temperature (20° C.) to 100° C. (at 20° C./min) and then rapidly cooled down to −140° C., before finally recording the DSC curve from −140° C. to +250° C. at 20° C./min.

This stage of the manufacture resulting in a control composite reinforcer (therefore not in accordance with the invention) consisting of the initial steel cord sheathed only with its polyamide first layer. This control composite reinforcer (denoted by R-5) had a total diameter (i.e. once sheathed) of about 1.0 mm.

Next, during a second step, a second layer of an epoxidized diene elastomer was deposited, with an intended minimum thickness ($E_{m2}$) of a few tens of nanometers, on the cord thus sheathed in the following manner. The cord covered with polyamide 6,6 was passed through a coating bath, at a speed of about 4 m/min, and over a length of about 15 cm, between two wool baize elements pressed by a mass of 1 kg and continuously imbibed with the epoxidized diene elastomer, diluted, with a concentration of 5% by weight, in toluene so as in this way to cover all of it with an ultra-thin layer of elastomer. The reinforcer thus sheathed is then dried to remove the solvent by evaporation.

After this second sheathing operation, the assembly (doubly-sheathed composite reinforcer) underwent a thermo-oxidative treatment for a time of about 100 s, by passing it through a tunnel oven at 3 m/min in an ambient atmosphere, heated to a temperature of 270° C. This final stage of the manufacture resulted in a composite reinforcer according to the invention, consisting of the initial steel cord sheathed with its polyamide first layer and with its second layer of epoxidized diene elastomer. The composite reinforcer according to the invention produced in this way (the reinforcer R-2 as shown schematically in FIG. 2) had a final total diameter of about 1.1 mm.

To determine the best operating conditions for the thermo-oxidative treatment in this trial, a range of temperatures from 160° C. to 280° C., for four treatment times (50 s, 100 s, 200 s and 400 s), was examined beforehand.

During these manufacturing trials, three different epoxidized diene elastomers were used, namely an epoxidized polybutadiene (BR) ("Poly bd" 605E from the company Sartomer), an epoxidized NR ("ENR-50" from International Malaysia SDB BHD) and finally an epoxidized SBR (degree of epoxidation equal to 11% (mol %); Tg −40° C.; 28% styrene, 55% 1,4-bonds and 17% 1,2-bonds).

Trial 2—Adhesion Tests

The quality of the bond between the rubber and the composite reinforcers manufactured above was then assessed by a test in which the force needed to extract the reinforcers from a vulcanized rubber composition, also called a vulcanizate, was measured. This rubber composition was a conventional composition used for the calendering of metal tire belt plies, based on natural rubber, carbon black and standard additives.

The vulcanizate was a rubber block consisting of two sheaths measuring 200 mm by 4.5 mm and with a thickness of 3.5 mm, applied against each other before curing (the thickness of the resulting block was then 7 mm). It was during the conduction of this block that the composite reinforcers (15 strands in total) were imprisoned between the two rubber sheets in the uncured state, an equal distance apart and with one end of each composite reinforcer projecting on either side of these sheets an amount sufficient for the subsequent tensile test. The block containing the reinforcers was then placed in a suitable mould and then cured under pressure. The curing temperature and the curing time, left to the discretion of a person skilled in the art, were adapted to the intended test conditions. For example, in the present case, the block was cured at 160° C. for 15 minutes under a pressure of 16 bar.

After being cured, the specimen, thus consisting of the vulcanized block and the 15 reinforcers, was placed between the jaws of a suitable tensile testing machine so as to pull each reinforcer individually out of the rubber, at a given pull rate and a given temperature (for example, in the present case, at 50 mm/min and 20° C. respectively). The adhesion levels were characterized by measuring the pull-out force (denoted by $F_{max}$) for pulling the reinforcers out of the specimen (this being an average over 15 tensile tests).

It was found that the composite reinforcers of the invention, despite the fact that they contain no RFL adhesive (or any other adhesive), had a particularly high and unexpected pull-out force $F_{max}$ always greater than the control pull-out force measured on the nylon-sheathed control composite reinforcer (R-5) and bonded using a conventional RFL adhesive: at ambient temperature (25° C.) and for a relative base equal to 100 for the control composite reinforcer R-5, the composite reinforcers of the invention, with a second layer respectively made of epoxidized NR, BR and SBR, had a pull-out force $F_{max}$ that was increased by 20%, 50% and 190%, compared to the control composite reinforcer R-5.

Under the same conditions, the control composite reinforcer (R-5) sheathed with nylon but containing no RFL adhesive (or any other adhesive), showed no adhesion to the rubber (practically zero pull-out force).

Consequently, the composite reinforcer of the invention constitutes, by virtue of its self-adhesive nature, a particularly useful alternative, on account of the very high adhesion levels obtained, to the composite reinforcers of the prior art that are sheathed with a thermoplastic material such as a polyamide or polyester which require, as is known, the use of an RFL adhesive to ensure that they adhere to the rubber.

The invention claimed is:

1. A composite reinforcer comprising:
   one or more reinforcing thread(s);
   a first layer of a thermoplastic polymer, the glass transition temperature of which is positive, covering said thread, individually each thread or collectively several threads; and
   a second layer consisting of a functionalized diene elastomer bearing functional groups selected from epoxide, carboxyl, acid anhydride and acid ester groups, covering the first layer.

2. The reinforcer according to claim 1, wherein the glass transition temperature of the thermoplastic polymer is greater than +20° C.

3. The reinforcer according to claim 1, wherein the thermoplastic polymer is an aliphatic polyamide or a polyester.

4. The reinforcer according to claim 3, wherein the thermoplastic polymer is a polyamide 6,6.

5. The reinforcer according to claim 1, wherein the diene elastomer is selected from the group consisting of natural rubber, synthetic polyisoprenes, polybutadienes, butadiene copolymers, isoprene copolymers and mixtures of these elastomers.

6. The reinforcer according to claim 1, wherein the diene elastomer is an epoxidized diene elastomer.

7. The reinforcer according to claim 6, wherein the diene elastomer is a natural rubber or a synthetic polyisoprene.

8. The reinforcer according to claim 6, wherein the diene elastomer is a polybutadiene or a butadiene/styrene copolymer.

9. The reinforcer according to claim 1, wherein the minimum thickness of the first layer is between 1 μm and 2 mm.

10. The reinforcer according to claim 1, wherein the minimum thickness of the second layer lies in the range from 0.02 μm to 10 μm.

11. The reinforcer according to claim 1, wherein the reinforcing thread is made of metal.

12. The reinforcer according to claim 11, wherein the metal wire is a carbon steel wire.

13. A rubber article or semi-finished product comprising a composite reinforcer according to claim 1.

14. A pneumatic tire comprising a composite reinforcer according to claim 1.

15. A process for manufacturing a composite reinforcer according to claim 1, comprising the steps of:
   the reinforcing thread or each reinforcing thread is covered individually, or several reinforcing threads are covered collectively by a first layer of the thermoplastic polymer having a positive glass transition temperature;
   a second layer comprising the functionalized diene elastomer bearing functional groups selected from epoxide, carboxyl, acid anhydride and acid ester groups, is deposited on the first layer; and
   the assembly undergoes a thermo-oxidative treatment.

16. The process according to claim 15, wherein the glass transition temperature of the thermoplastic polymer is above +20° C.

17. The process according to claim 15, wherein the thermoplastic polymer is an aliphatic polyamide or a polyester.

18. The process according to claim 15, wherein the diene elastomer is selected from the group consisting of natural rubber, synthetic polyisoprenes, polybutadienes, butadiene copolymers, isoprene copolymers and mixtures of these elastomers.

19. The process according to claim 15, wherein the diene elastomer is an epoxidized diene elastomer.

20. The process according to claim 19, wherein the diene elastomer is a natural rubber or a synthetic polyisoprene.

21. The process according to claim 19, wherein the diene elastomer is a polybutadiene or a butadiene/styrene copolymer.

22. The process according to claim 15, which further includes a final step of crosslinking the composite reinforcer.

\* \* \* \* \*